(12) United States Patent
Niwa et al.

(10) Patent No.: US 11,241,972 B2
(45) Date of Patent: Feb. 8, 2022

(54) VEHICLE AND METHOD OF CONTROLLING THE SAME

(71) Applicant: Toyota Jidosha Kabushiki Kaisha, Toyota (JP)

(72) Inventors: Yamato Niwa, Kariya (JP); Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 112 days.

(21) Appl. No.: 16/717,093

(22) Filed: Dec. 17, 2019

(65) Prior Publication Data
US 2020/0207232 A1 Jul. 2, 2020

(30) Foreign Application Priority Data
Dec. 27, 2018 (JP) .............................. JP2018-244269

(51) Int. Cl.
| | |
|---|---|
| *B60L 53/62* | (2019.01) |
| *B60L 53/22* | (2019.01) |
| *B60L 53/30* | (2019.01) |
| *B60L 53/31* | (2019.01) |
| *B60L 50/60* | (2019.01) |
| *B60L 53/18* | (2019.01) |

(52) U.S. Cl.
CPC ............... *B60L 53/62* (2019.02); *B60L 50/66* (2019.02); *B60L 53/22* (2019.02); *B60L 53/305* (2019.02); *B60L 53/31* (2019.02); *B60L 53/18* (2019.02); *B60L 2210/10* (2013.01); *B60L 2240/622* (2013.01)

(58) Field of Classification Search
CPC ........................................................ B60L 53/62
USPC ........................................................... 320/109
See application file for complete search history.

(56) References Cited

U.S. PATENT DOCUMENTS

| | | | |
|---|---|---|---|
| 8,476,866 B2 * | 7/2013 | Miwa .................... | H02J 7/0047 320/107 |
| 2010/0301809 A1 * | 12/2010 | Bhade .................... | B60L 53/68 320/148 |
| 2014/0316939 A1 * | 10/2014 | Uyeki .................... | B60L 58/12 705/26.9 |

(Continued)

FOREIGN PATENT DOCUMENTS

| | | |
|---|---|---|
| JP | 2011-252816 A | 12/2011 |
| JP | 2014-212690 A | 11/2014 |

*Primary Examiner* — Jerry D Robbins
(74) *Attorney, Agent, or Firm* — Dinsmore & Shohl LLP

(57) ABSTRACT

A vehicle performs external charging in which a battery mounted on the vehicle is charged with power supplied from a charger provided external to the vehicle in accordance with a prescribed charging standard. The vehicle includes: a short-distance communication module and a navigation screen that provide a user of the vehicle with information on the external charging; and an ECU that controls the short-distance communication module and the navigation screen. The ECU controls the short-distance communication module and the navigation screen, when failure to perform the external charging in accordance with the charging standard is caused by the charger, to provide the user with at least one of information that the failure is caused by the charger and information that it is recommended to use another charger other than the charger.

9 Claims, 5 Drawing Sheets

(56) References Cited

U.S. PATENT DOCUMENTS

| | | | |
|---|---|---|---|
| 2015/0137768 A1* | 5/2015 | Kishiyama | B60L 58/27 |
| | | | 320/137 |
| 2016/0221464 A1* | 8/2016 | Mu | H02J 7/00 |
| 2017/0282736 A1* | 10/2017 | Goei | B60L 53/665 |
| 2019/0275893 A1* | 9/2019 | Sham | B60L 53/31 |

* cited by examiner

VEHICLE AND METHOD OF CONTROLLING THE SAME

CROSS REFERENCE TO RELATED APPLICATIONS

This nonprovisional application claims priority to Japanese Patent Application No. 2018-244269 filed on Dec. 27, 2018 with the Japan Patent Office, the entire contents of which are hereby incorporated by reference.

BACKGROUND

Field

The present disclosure relates to a vehicle and a method of controlling the same, and more specifically to a technique of charging a vehicle-mounted power storage device using power supplied from a charger provided external to a vehicle.

Description of the Background Art

Plug-in hybrid vehicles and electric vehicles are becoming commercially available. These vehicles are configured to perform "external charging" in which a vehicle-mounted power storage device is charged with power supplied from a charger provided external to the vehicle. In order to appropriately perform the external charging, it is required to ensure compatibility between the charger installed in a charging station or the like and the vehicle.

Japanese Patent Laying-Open No. 2014-212690, for example, discloses a technique in which a remote server selects a charger for an electric vehicle. This remote server determines, based on a comparison between data on chargers stored in a database and a charging request transmitted from an arithmetic unit of the vehicle, at least one compatible charger (a charger that supports requirements for the charging request) from one or a plurality of chargers.

SUMMARY

The capacity of a vehicle-mounted power storage device is expected to increase in the future. EV distance of a vehicle (distance that can be traveled by the vehicle using power stored in the power storage device) can thereby be increased. An excessively extended charging time due to the increased capacity of the power storage device, however, may reduce user convenience. Accordingly, it has been considered to perform external charging at higher power (several tens of kW to several hundreds of kW, for example) than conventional power in order to shorten the charging time. Such charging is hereinafter also referred to as "quick charging."

Generally, external charging takes place by a vehicle and a charger cooperating to perform a series of processes in accordance with a predetermined charging standard. Quick charging employs a charging standard (new standard) different from that for conventional charging. Therefore, when various types of chargers hit the market at the beginning of widespread use of quick charging, for example, there may be chargers that do not fully conform to the new standard. No consideration has been conventionally given to what measures should be taken in order to improve user convenience when a user utilizing the quick charging encounters a charger that is nonconforming to the new standard, and is unable to appropriately perform the quick charging of a vehicle.

The present disclosure has been made to solve the above-described problem, and has an object to improve user convenience when a user's vehicle cannot be appropriately charged.

(1) A vehicle according to one aspect of the present disclosure performs external charging in which a power storage device mounted on the vehicle is charged with power supplied from a charger provided external to the vehicle in accordance with a prescribed charging standard. The vehicle includes: an information provision device that provides a user of the vehicle with information on the external charging; and a controller that controls the information provision device. The controller controls the information provision device, when failure to perform the external charging in accordance with the charging standard is caused by the charger, to provide the user with at least one of information that the failure is caused by the charger and information that it is recommended to use another charger other than the charger.

(2) The controller determines that the failure is caused by the charger when it is detected by communication between the controller and the charger that the charger does not conform to the prescribed charging standard.

(3) The vehicle further includes: a power converter that converts power supplied from the charger into power for charging the power storage device; a voltage sensor that detects a voltage of the power supplied from the charger to the power converter; and a current sensor that detects a current flowing from the charger to the power converter. The controller determines that the failure is caused by the charger when it is detected using at least one of the voltage sensor and the current sensor that the power supplied from the charger does not conform to the prescribed charging standard.

According to the configurations of (1) to (3), by receiving the provision of information from the vehicle, the user can know that the failure to perform the external charging is not caused by the vehicle, and therefore does not need to have the vehicle diagnosed for the presence of abnormality at a dealer or the like. Alternatively, by receiving the provision of information from the vehicle, the user can move the vehicle to another vehicle and attempt to perform charging by that charger. Therefore, user convenience can be improved.

(4) The vehicle further includes a location information acquisition device that acquires location information on a current location of the vehicle. The information provision device provides the user with location information on a plurality of chargers. When the failure is caused by the charger, the controller extracts, as the another charger, at least one charger installed around the current location of the vehicle from the plurality of chargers, and controls the information provision device to provide the user with location information on the extracted charger.

According to the configuration of (4), the user can know of a charger installed around the current location of the vehicle without searching for a charger by oneself. The user can thus readily move the vehicle for charging. Therefore, user convenience can be further improved.

(5) The controller excludes location information on the charger that causes the failure from the location information on the plurality of chargers provided to the user in subsequent occasions of the external charging.

It is highly likely that the external charging cannot be performed even at the second attempt to perform the external charging by the charger that causes the failure (nonconforming charger). According to the configuration of (5), since the location information on this charger is excluded, the second attempt to perform the external charging by this charger is prevented. Therefore, user convenience can be further improved.

(6) In a method of controlling a vehicle according to another aspect of the present disclosure, the vehicle performs external charging in which a power storage device mounted on the vehicle is charged with power supplied from a charger provided external to the vehicle in accordance with a prescribed charging standard. The method of controlling a vehicle includes: determining whether or not failure to perform the external charging in accordance with the charging standard is caused by the charger; and when failure to perform the external charging in accordance with the charging standard is caused by the charger, providing a user of the vehicle with at least one of information that the failure is caused by the charger and information that it is recommended to use another charger other than the charger.

According to the method of (6), user convenience can be improved in a manner similar to the configuration of (1).

The foregoing and other objects, features, aspects and advantages of the present disclosure will become more apparent from the following detailed description of the present disclosure when taken in conjunction with the accompanying drawings.

DETAILED DESCRIPTION

Figure 1:
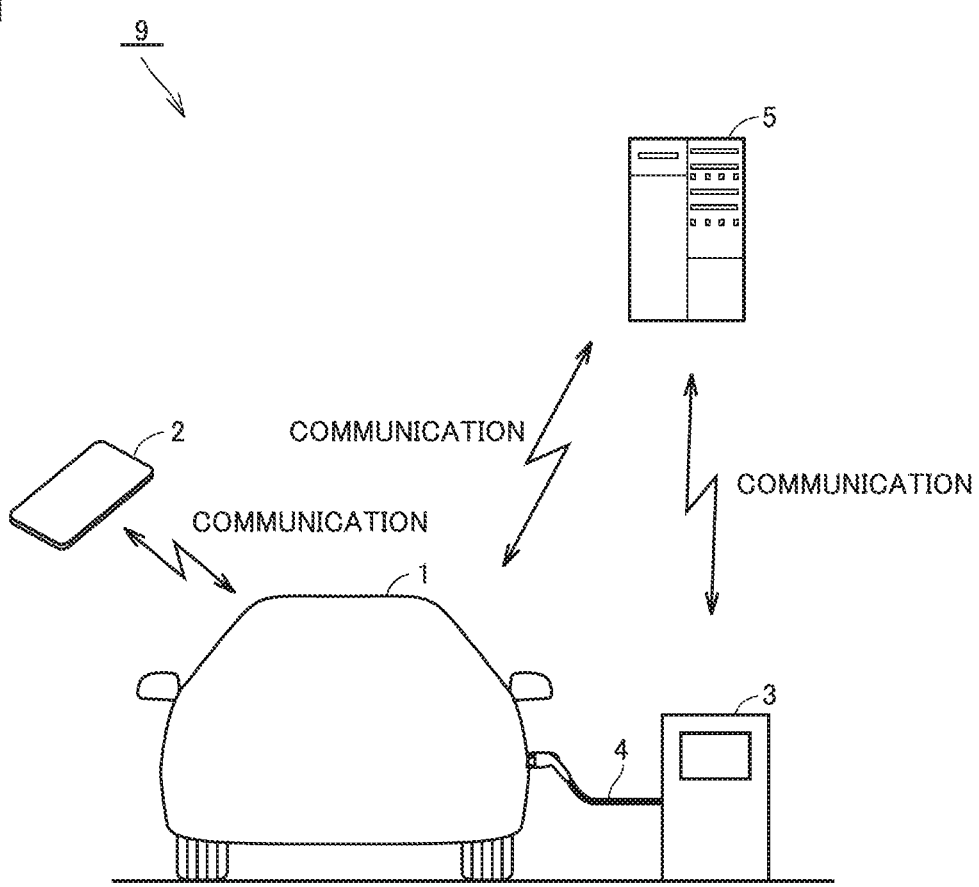
FIG. 1 schematically shows an overall configuration of a charging system according to the present embodiment.

The present embodiment is described below in detail with reference to the drawings. The same or corresponding parts are denoted by the same characters in the drawings and description thereof will not be repeated.

Embodiment

<Configuration of Charging System>

FIG. 1 schematically shows an overall configuration of a charging system according to the present embodiment. Referring to FIG. 1, a charging system 9 includes a user's vehicle 1, a portable terminal 2 carried by the user, a charger 3, a charging cable 4 extending from charger 3, and a server 5 provided at a remote location.

Vehicle 1 is, for example, an electric vehicle having a battery 11 (see FIG. 2) mounted thereon. Vehicle 1 is configured to perform "external charging" in which battery 11 is charged with power supplied from charger 3, while vehicle 1 and charger 3 are electrically connected to each other by charging cable 4. Vehicle 1 should only be configured to perform the external charging, and may be a plug-in hybrid vehicle or a fuel cell vehicle.

Portable terminal 2 is the user's smartphone, smartwatch or the like. Vehicle 1 and portable terminal 2 are configured to conduct bidirectional communication with each other. This allows the user to understand a situation of external charging of vehicle 1 through portable terminal 2.

Charger 3 is installed in a public charging station (also referred to as charging spot), for example. Charger 3 converts AC power (three-phase 200 V power, for example) supplied from a commercial power supply into DC power, and supplies the DC power to vehicle 1.

In the present embodiment, charger 3 is a charger that supports quick charging. A situation is assumed, however, where charger 3 is not completely compliant with a charging station for quick charging, and compatibility of external charging may not be guaranteed between vehicle 1 and charger 3. In other words, it is assumed that charger 3 may not conform to the charging standard for quick charging.

Server 5 manages various types of information for use in external charging of a multitude of vehicles including vehicle 1. Vehicle 1 and server 5 are configured to conduct bidirectional communication with each other. This allows server 5 to give and receive necessary information to and from vehicle 1. Charger 3 and server 5 are also configured to conduct bidirectional communication with each other. This allows server 5 to collect information indicating a usage condition of charger 3, for example.

Figure 2:
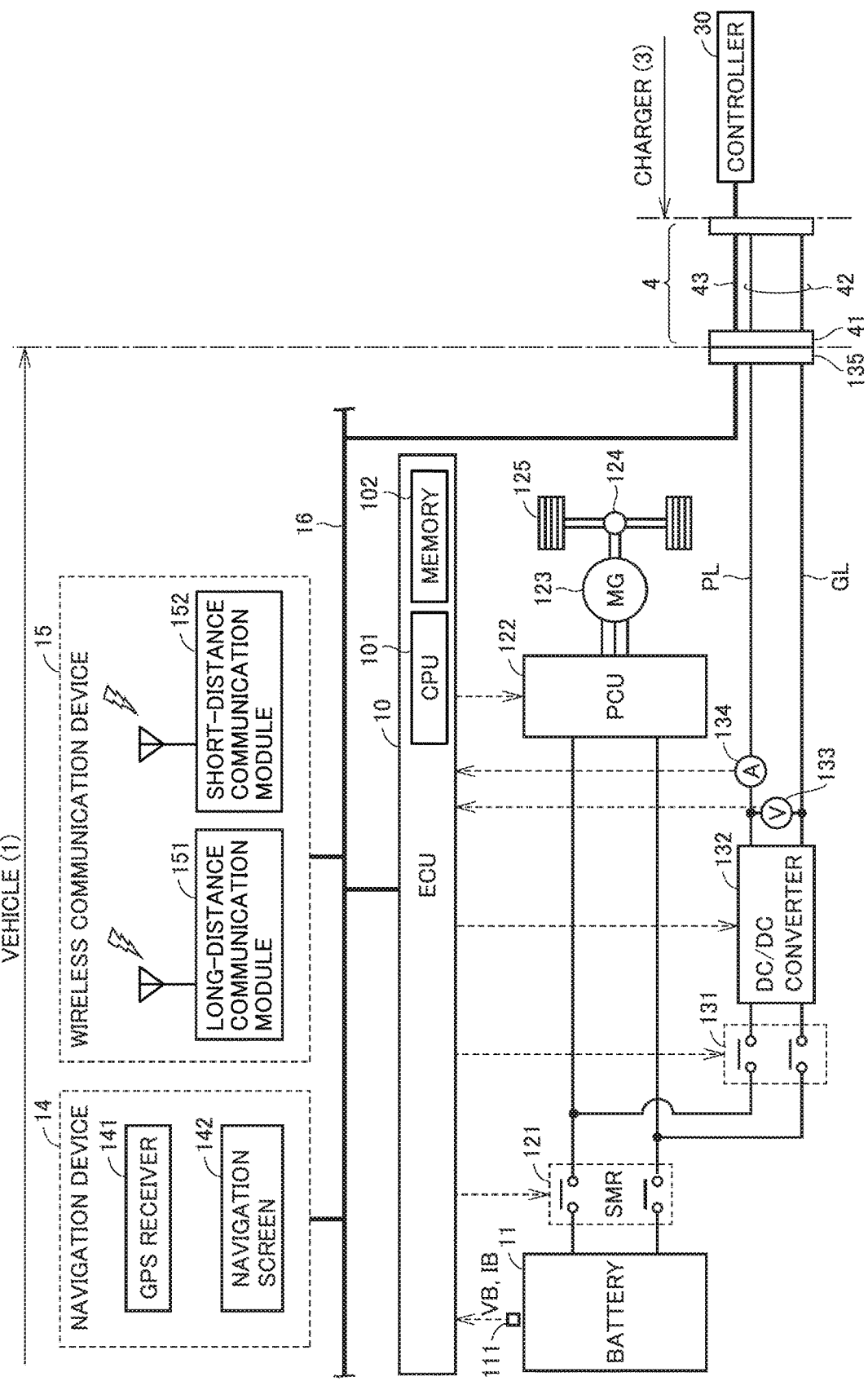
FIG. 2 shows the configuration of the charging system in more detail.

FIG. 2 shows the configuration of charging system 9 in more detail. Referring to FIGS. 1 and 2, vehicle 1 includes battery 11, a monitoring unit 111, a system main relay (SMR) 121, a power control unit (PCU) 122, a motor generator (MG) 123, a drive-train gear 124, a driving wheel 125, and an ECU (Electronic Control Unit) 10.

Battery 11 is a rechargeable power storage device, and is configured to include a secondary battery such as a lithium ion secondary battery or a nickel-metal hydride secondary battery. Battery 11 supplies to PCU 122 power for generating driving force for travel of vehicle 1. Battery 11 is charged with power generated by regenerative braking of motor generator 123, and is charged with power supplied from charger 3. A capacitor such as an electric double layer capacitor may be employed instead of battery 11.

Monitoring unit 111 monitors a state of battery 11. Monitoring unit 111 includes a voltage sensor, a current sensor, and a temperature sensor, although none is shown in the figure. The voltage sensor detects a voltage VB of battery 11. The current sensor detects a current IB that is input to and output from battery 11. The temperature sensor detects a temperature of battery 11. Each sensor outputs a result of the detection to ECU 10. ECU 10 can calculate an SOC (State Of Charge) of battery 11 based on the detection result from each sensor.

SMR 121 is electrically connected between battery 11 and PCU 122. The closing/opening of SMR 121 is controlled in accordance with a command from ECU 10.

PCU 122 is a power converter that performs power conversion between battery 11 and motor generator 123 in accordance with a command from ECU 10. PCU 122 is configured to include an inverter that receives power from battery 11 to drive motor generator 123, a converter that adjusts the level of a DC voltage supplied to the inverter (neither shown), and the like.

Motor generator 123 is an AC motor, for example, a permanent-magnet type synchronous motor including a rotor (not shown) having a permanent magnet embedded therein. Motor generator 123 is driven by the inverter included in PCU 122, to rotate a drive shaft (not shown). Torque that is output from motor generator 123 is transmitted to driving wheel 125 through drive-train gear 124, causing vehicle 1 to travel. During braking of the vehicle, motor generator 123 receives rotational force of the driving wheel to generate power. The power generated by motor generator 123 is charged to battery 11 through PCU 122.

Vehicle 1 further includes, as a configuration for quick charging, a charging relay 131, a DC/DC converter 132, a voltage sensor 133, a current sensor 134, power lines PL, GL, and an inlet 135. During quick charging of battery 11, a connector 41 of charging cable 4 is coupled to inlet 135. Then, power from charger 3 is supplied to vehicle 1 through a power line 42 within charging cable 4, and transmitted to DC/DC converter 132 through power lines PL, GL.

Charging relay 131 is electrically connected between battery 11 and DC/DC converter 132. When charging relay 131 is closed and SMR 121 is closed, power transmission between inlet 135 and battery 11 is enabled.

DC/DC converter 132 is electrically connected between charging relay 131 and inlet 135. DC/DC converter 132 converts power supplied from charger 3 into power for charging battery 11 in accordance with a command from ECU 10. DC/DC converter 132 corresponds to a "power converter" according to the present disclosure. DC/DC converter 132 may be configured to convert power from battery 11 into power for output to the outside of the vehicle.

Voltage sensor 133 is electrically connected between power line PL and power line GL. Voltage sensor 133 detects a voltage of power supplied from charger 3 to DC/DC converter 132, and outputs a result of the detection to ECU 10.

Current sensor 134 is electrically connected to power line PL. Current sensor 134 detects a current flowing from charger 3 to DC/DC converter 132, and outputs a result of the detection to ECU 10.

Vehicle 1 further includes, as a configuration for obtaining a traveling situation of vehicle 1 and communicating with the outside of the vehicle, a navigation system 14 and a wireless communication device 15. ECU 10, navigation system 14 and wireless communication device 15 are connected to one another by a wired vehicle-mounted network 16 such as a CAN (Controller Area Network), and are configured to communicate with one another. While vehicle 1 and charger 3 are connected to each other by charging cable 4, ECU 10 can also conduct bidirectional communication with a controller 30 of charger 3 through a communication line 43 within charging cable 4 and vehicle-mounted network 16.

Navigation system 14 includes a GPS (Global Positioning System) receiver 141 that identifies a current location of vehicle 1 based on electric waves from artificial satellites. Navigation system 14 acquires location information (GPS information) on the current location of vehicle 1 by GPS receiver 141, and uses the acquired location information to perform various types of navigations processes of vehicle 1. GPS receiver 141 corresponds to a "location information acquisition device" according to the present disclosure.

Navigation system 14 further includes a display with a touch panel (hereinafter also referred to as "navigation screen") 142. Navigation screen 142 accepts various operations by the user. Navigation screen 142 also displays the current location of vehicle 1 that is superimposed on a road map, and displays information transmitted from server 5 to vehicle 1 or information from ECU 10. Navigation screen 142 is configured to provide the user of vehicle 1 with information on quick charging, and is therefore an example of an "information provision device" according to the present disclosure.

Wireless communication device 15 includes a long-distance communication module 151 and a short-distance communication module 152. Long-distance communication module 151 is configured to conduct bidirectional data communication with server 5.

Short-distance communication module 152 is configured to conduct bidirectional data communication with the user's portable terminal 2 located at a short distance (about several meters to several tens of meters, for example) from vehicle 1. Short-distance communication module 152 is configured to provide the user of vehicle 1 with information on quick charging, similarly to navigation screen 142, and is therefore another example of the "information provision device" according to the present disclosure. In some embodiments, the short-distance communication module 152 for the communication with portable terminal 2 may not be used, and long-distance communication module 151 may be used. In that case, long-distance communication module 151 corresponds to the "information provision device" according to the present disclosure.

ECU 10 is configured to include a CPU (Central Processing Unit) 101, a memory 102, input/output ports (not shown) for inputting/outputting various signals, and the like. ECU 10 controls the respective devices (such as SMR 121, PCU 122, charging relay 131 and DC/DC converter 132) within vehicle 1 in order to attain a desired state of vehicle 1. ECU 10 also transmits various types of information (such as the location information on vehicle 1) to server 5 and receives information from server 5 through long-distance communication module 151. ECU 10 can further exchange information on quick charging with portable terminal 2 through short-distance communication module 152. ECU 10 corresponds to a "controller" according to the present disclosure.

<Charging Standard>

Quick charging employs a charging standard (new standard) different from that for conventional charging (so-called normal charging). Therefore, there may be chargers that do not conform to the new standard particularly at the beginning of widespread use of quick charging. When charger 3 does not fully conform to the new standard, it may be impossible to appropriately perform the quick charging. Specifically, the quick charging may not be started, or even if the quick charging is started, the charging may be stopped before being completed. In such cases, it is desirable to improve convenience of a user utilizing the quick charging.

In the present embodiment, therefore, when the quick charging of vehicle 1 cannot be appropriately performed due to nonconformity of charger 3 to the new standard, a configuration is employed in which information as described below is provided to the user from vehicle 1.

<Provision of Information to User>

Figure 3:
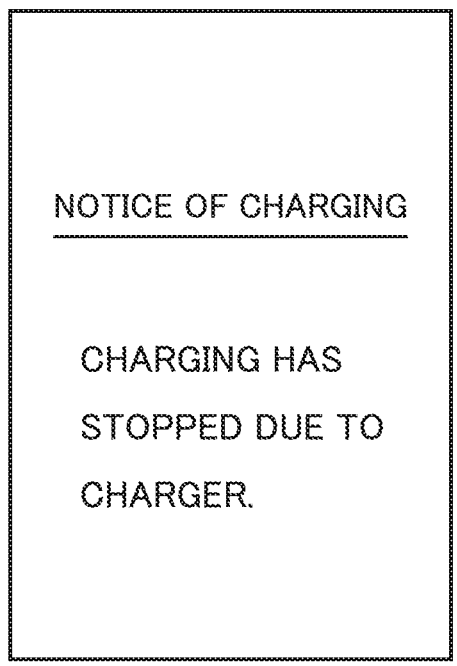
FIG. 3 shows an example of information provided to a user from a vehicle.

FIG. 3 shows an example of information provided to the user from vehicle 1. Referring to FIG. 3, vehicle 1 uses short-distance communication module 152 to notify the user's portable terminal 2 that the failure to perform the quick charging was caused by charger 3. Instead of or in addition to portable terminal 2, the notification may be given on navigation screen 142 of navigation system 14.

When the user is not provided with any information on the cause of failure to perform the quick charging, the user does not know whether the failure is caused by vehicle 1 or by charger 3, and may therefore suspect an abnormality (fault) of vehicle 1 or worry about whether vehicle 1 needs repair. By receiving the provision of information as shown in FIG. 3, the user can know that the failure to perform the quick charging is not caused by the user's vehicle 1, and can therefore feel a sense of relief. It is also unnecessary for the user to take vehicle 1 to a dealer or the like and have vehicle 1 diagnosed for the presence of abnormality. Therefore, user convenience can be improved.

Figure 4:
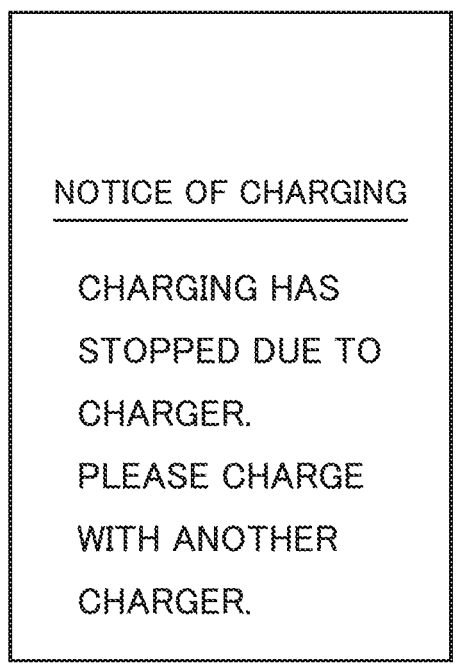
FIG. 4 shows another example of information provided to the user from the vehicle.

FIG. 4 shows another example of information provided to the user from vehicle 1. As shown in FIG. 4, in addition to the notification that the failure to perform the quick charging is caused by charger 3, vehicle 1 may notify the user that it is recommended to use another charger (not shown) other than charger 3 currently being used. This "another charger" is not limited to a charger that supports quick charging, but may be a charger that supports only normal charging. As a result, the user can move vehicle 1 to another charger and attempt to perform external charging (quick charging or normal charging) by that charger. User convenience can thus be improved.

Figure 5:
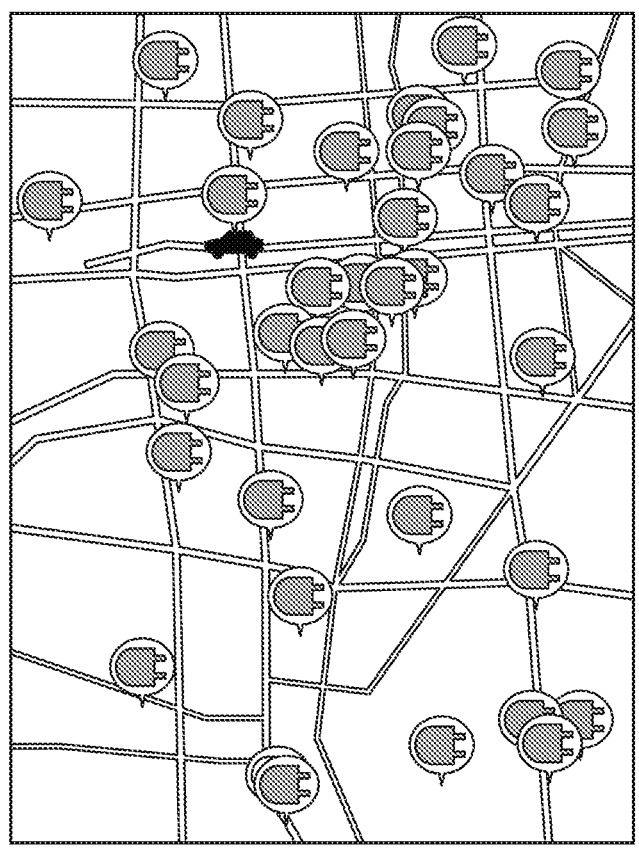
FIG. 5 shows yet another example of information provided to the user from the vehicle.

FIG. 5 shows yet another example of information provided to the user from vehicle 1. Referring to FIG. 5, when recommending the user to use another charger as was described in FIG. 4, vehicle 1 may additionally provide location information on another charger installed around the current location of vehicle 1. The information on the current location of vehicle 1 can be acquired using GPS receiver 141 included in navigation system 14. The location information on another charger, on the other hand, may be stored in advance in a memory (not shown) of navigation system 14, or may be acquired each time by the communication between vehicle 1 and server 5.

Providing the location information on another charger can save the user the trouble of searching for another charger. The user can thus readily move vehicle 1 to another charger. User convenience can thus be further improved.

Further, in the location information such as shown in FIG. 5, if there is any charger by which external charging could not be performed due to its nonconformity to the new standard when vehicle 1 attempted to perform external charging in the past (hereinafter also referred to as "nonconforming charger"), the nonconforming charger may not displayed on portable terminal 2.

Specifically, when external charging could not be appropriately performed, in vehicle 1, location information on the nonconforming charger (actually, location information on vehicle 1 connected to this charger) is written in a nonvolatile fashion to the memory (not shown) of navigation system 14. As a result, vehicle 1 can exclude the nonconforming charger from candidates for another charger in subsequent searches for another charger.

Alternatively, vehicle 1 may use long-distance communication module 151 to transmit the location information on the nonconforming charger to server 5. Server 5 stores the location information on the nonconforming charger received from vehicle 1 in a database (not shown). Then, when the provision of location information on another charger is requested by vehicle 1 the next time, server 5 reads the location information on the nonconforming charger from the database, and excludes the nonconforming charger from search results for another charger that are provided to vehicle 1.

It is highly likely that appropriate charging cannot be performed even at the second attempt to perform the external charging by the nonconforming charger. By excluding the nonconforming charger from search results for another charger and not displaying the nonconforming charger on portable terminal 2 or navigation screen 142, the user is prevented from selecting the nonconforming charger. User convenience can thus be further improved.

In both examples described in FIGS. 3 and 4, the notification is given that the failure to appropriately perform the external charging is caused by charger 3. In some embodiments, only the notification may be given that it is recommended to use another charger. Namely, in the present disclosure, it is only required to give at least one of the notification that the failure to perform the external charging is caused by charger 3 and the notification that it is recommended to use another charger.

<External Charging Flow>

Figure 6:
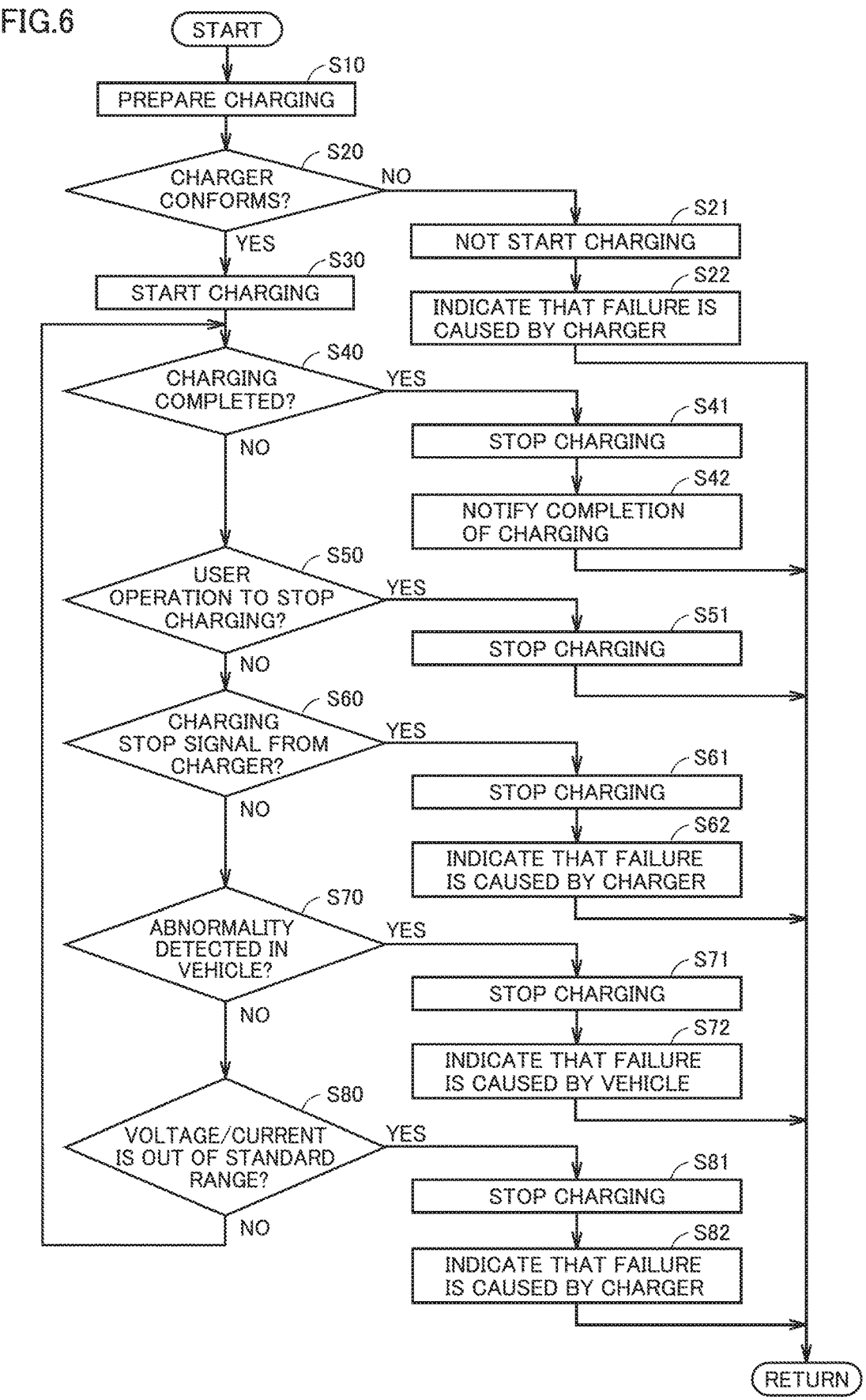
FIG. 6 is a flowchart showing external charging control in the present embodiment.

FIG. 6 is a flowchart showing external charging control in the present embodiment. This flowchart is invoked from a main routine (not shown) and performed when connector 41 of charging cable 4 is inserted into inlet 135 of vehicle 1 to enable communication between ECU 10 of vehicle 1 and controller 30 of charger 3.

Each step (step abbreviated as S hereinafter) included in this flowchart is performed by software processing by ECU 10, but may performed by hardware (electric circuit) processing fabricated in ECU 10. For the simplicity of description, the subject of processing performed by controller 30 of charger 3 will be referred to simply as charger 3.

Referring to FIG. 6, in S10, ECU 10 performs a series of processes defined by a charging standard with charger 3, as preparation for starting quick charging. For example, first, communication between ECU 10 and charger 3 is established through a prescribed communication procedure (charging handshake stage). In the charging handshake stage, ECU 10 and charger 3 exchange information on charging standards with which ECU 10 and charger 3 are compliant (such as information on protocol versions). Charger 3 also transmits an identification message of charger 3 to ECU 10. Upon receiving the identification message from charger 3, ECU 10 returns to charger 3 a message that charger 3 has been identified. It is thus confirmed that a communication link between ECU 10 and charger 3 is correct.

Further, after the charging handshake stage, ECU 10 and charger 3 exchange various parameters for use in charging (charging parameter arrangement stage). For example, ECU 10 transmits information on voltage VB and a temperature TB of battery 11 to charger 3. Charger 3, on the other hand, transmits information on maximum output capability of charger 3 to ECU 10.

In S20, ECU 10 determines, based on a result of the process in S10, whether or not charger 3 conforms to a new standard. When the charging standard with which ECU 10 is compliant does not conform to the charging standard with which charger 3 is compliant, ECU 10 determines that charger 3 does not conform to the new standard.

Alternatively, ECU 10 may determine that charger 3 does not conform to the new standard when the communication data received from charger 3 in the charging handshake stage or the charging parameter arrangement stage is not compliant with the new standard. Specifically, ECU 10 can determine that charger 3 does not conform to the new standard, for example, when the order of transmission of the communication data (communication sequence) is not in accordance with the new standard, when the timing of transmission of the communication data (interval, delay or the like) is out of a predefined range, or when the meaning of charging parameters and the like included in the contents (data division) of the communication data is not defined by the new standard.

When charger 3 does not conform to the new standard (NO in S20), ECU 10 determines to not start the quick charging of vehicle 1 by charger 3 (to stop the quick charging) (S21). Then, as was described in FIGS. 3 to 5, ECU 10 notifies the user of information that the failure to start the quick charging is caused by charger 3 (S22). The user's portable terminal 2 may be used or navigation screen 142 may be used for this notification. This use also applies to subsequent notifications.

When charger 3 conforms to the new standard (YES in S20), ECU 10 proceeds the process to S30, and starts the quick charging of vehicle 1. Then, ECU 10 determines whether or not a completion condition for the quick charging has been satisfied (S40). ECU 10 can determine that the quick charging has been completed when, for example, the SOC of battery 11 reaches a full SOC. Alternatively, ECU 10 may determine that the charging has been completed when the SOC of battery 11 reaches a value specified in advance by the user (a value lower than the full SOC). Alternatively, ECU 10 may determine that the charging has been completed when the current time reaches a time specified in advance by the user.

When the quick charging is completed (YES in S40), ECU 10 stops the quick charging of vehicle 1 (S41). Then, ECU 10 notifies the user that the quick charging has been normally completed (S42). The process is then returned to the main routine not shown in the figure.

When the completion condition for the quick charging has not been satisfied (NO in S40), on the other hand, ECU 10 proceeds the process to S50, and determines whether or not user operation requesting a stop of the quick charging has been accepted by vehicle 1. When an emergency stop button (not shown) provided on charger 3 is pressed, for example, ECU 10 stops the quick charging in accordance with a prescribed communication procedure with charger 3 (51). Although not shown, also in this case, the user may be notified that the charging has been stopped in accordance with the user operation.

When the above-described user operation has not been accepted (NO in S50), ECU 10 determines whether or not a charging stop signal (from something other than the user operation) has been received from charger 3 (S60). Specifically, ECU 10 can determine that the charging stop signal from charger 3 has been received, for example, when a signal indicating an abnormality (fault) of charger 3 has been received from charger 3, when a signal indicating overheating of charger 3 has been received from charger 3, or when a signal indicating a fault of connector 41 of charging cable 4 has been received from charger 3.

When the charging stop signal has been received from charger 3 (YES in S60), ECU 10 stops the quick charging of vehicle 1 (S61). Then, ECU 10 notifies the user of information that the stop of the quick charging was caused by charger 3 (S62). Since this stop of charging is not caused by the conformity (compatibility) of charger 3 to the new standard, the user may be notified that an abnormality (fault) has occurred in charger 3.

When the charging stop signal has not been received from charger 3 (NO in S60), ECU 10 determines whether or not an abnormality associated with the quick charging has been detected in vehicle 1 (S70). ECU 10 determines that an abnormality associated with the quick charging has been detected in vehicle 1, for example, when temperature TB of battery 11 exceeds an upper limit temperature, when the SOC of battery 11 exceeds an upper limit value, when charging current IB to battery 11 exceeds an upper limit current, when the insulation state of battery 11 is deteriorated (the ensuring of insulation can no longer be trusted), or when a fault occurs in charging relay 131.

When an abnormality has been detected in vehicle 1 (YES in S70), ECU 10 stops the quick charging of vehicle 1 (S71). In this case, ECU 10 notifies the user of information that the stop of the quick charging was caused by vehicle 1 (S72).

When an abnormality has not been detected in vehicle 1 (NO in S70), ECU 10 determines whether or not each of a voltage value and a current value of power supplied from charger 3 is within a range defined by the new standard (standard range) (S80). For example, when an error in a current value supplied from charger 3 and detected by current sensor 134 (actual current value) with respect to a current value requested by vehicle 1 to be supplied from charger 3 (requested current value) is greater than a prescribed value, ECU 10 determines that the actual current value is out of the standard range, and that charger 3 does not fully conform to the new standard, and stops the quick charging of vehicle 1 (S81).

Instead of or in addition to the above, ECU 10 may determine whether or not an amount of change (or a rate of change) in the actual current value from charger 3 is within a standard range. Before the SOC of battery 11 reaches the full SOC, ECU 10 causes the requested current value for charger 3 to decrease in order to reduce charging current IB to battery 11 as compared to that during normal operation. When a rate of reduction in the actual current value is slower than a lower limit value of the standard range despite such a request, ECU 10 determines that charger 3 does not fully conform to the new standard, and stops the quick charging of vehicle 1 (S81).

Furthermore, ECU 10 may determine whether or not a voltage supplied from charger 3 (detected value from voltage sensor 133) is within a standard range. For example, when the voltage supplied from charger 3 is higher than an upper limit value of a voltage range determined in accordance with voltage VB of battery 11, ECU 10 determines that the voltage supplied from charger 3 is out of the standard range, and that charger 3 does not fully conform to the new standard, and stops the quick charging of vehicle 1 (S81). Then, ECU 10 notifies the user of information that the stop of the charging is caused by charger 3 (S82).

When each of the voltage value and the current value of power supplied from charger 3 is within the standard range (NO in S80), ECU 10 returns the process to S40. Then, four determination processes (processes of S50, S60, S70, S80) in and after S50 are repeatedly performed until after the quick charging of vehicle 1 is completed. These four determination processes may be performed in any order, and the order can be changed as appropriate. These four determination processes and the determination process of S20 correspond to "determining whether or not failure to perform the external charging is caused by the charger" according to the present disclosure.

As described above, in the present embodiment, when the quick charging of vehicle 1 cannot be started due to the nonconformity of charger 3 to the standard (S21), or when the quick charging is stopped after the charging is started due to the nonconformity of charger 3 to the standard (S81), ECU 10 uses portable terminal 2 and/or navigation screen 142 to provide the user with information that the failure to appropriately perform the quick charging is caused by charger 3 (see FIG. 3). As a result, user convenience can be improved in that the user can know that the failure to perform the quick charging is not caused by the user's vehicle 1, and does not need to have vehicle 1 diagnosed for the presence of abnormality at a dealer or the like.

Instead of or in addition to the information that the failure to perform the quick charging is caused by charger 3, ECU 10 may provide the user with information that it is desirable to use another charger (see FIG. 4). As a result, user convenience can be further improved in that the user can be prompted (motivated) to move vehicle 1 to another charger.

Furthermore, in addition to the information that it is recommended to use another charger, ECU 10 may provide the user with location information on another charger provided in the vicinity of the current location of vehicle 1 (see FIG. 5). As a result, user convenience can be further improved in that the user can promptly move vehicle 1 to another charger. In providing the location information on another charger, any charger incompatible with vehicle 1 may not displayed based on past results of charging of vehicle 1. As a result, user convenience can be further improved since the user is prevented from selecting the nonconforming charger.

Although the embodiment of the present disclosure has been described, it should be understood that the embodiment disclosed herein is illustrative and non-restrictive in every respect. The scope of the present disclosure is defined by the terms of the claims, and is intended to include any modifications within the meaning and scope equivalent to the terms of the claims.

What is claimed is:

1. A vehicle that performs external charging in which a power storage device mounted on the vehicle is charged with power supplied from a charger provided external to the vehicle in accordance with a prescribed charging standard, the vehicle comprising:
   an information provision device that provides a user of the vehicle with information on the external charging; and
   a controller that controls the information provision device,
   the controller controlling the information provision device, when failure to perform the external charging in accordance with the charging standard is caused by the charger, to provide the user with at least one of information that the failure is caused by the charger and information that it is recommended to use another charger other than the charger, the controller determining the failure of the charger.

2. The vehicle according to claim 1, wherein
   the controller determines that the failure is caused by the charger when it is detected by communication between the controller and the charger that the charger does not conform to the charging standard.

3. The vehicle according to claim 1, further comprising:
   a power converter that converts power supplied from the charger into power for charging the power storage device;
   a voltage sensor that detects a voltage of the power supplied from the charger to the power converter; and
   a current sensor that detects a current flowing from the charger to the power converter, wherein
   the controller determines that the failure is caused by the charger when it is detected using at least one of the voltage sensor and the current sensor that the power supplied from the charger does not conform to the charging standard.

4. The vehicle according to claim 1, further comprising:
   a location information acquisition device that acquires location information on a current location of the vehicle, wherein
   the information provision device provides the user with location information on a plurality of chargers, and
   when the failure is caused by the charger, the controller extracts, as the another charger, at least one charger installed around the current location of the vehicle from the plurality of chargers, and controls the information provision device to provide the user with location information on the extracted charger.

5. The vehicle according to claim 4, wherein
   the controller excludes location information on the charger that causes the failure from the location information on the plurality of chargers provided to the user in subsequent occasions of the external charging.

6. The vehicle according to claim 1, wherein the controller determines the failure of the charger after the vehicle is connected to the charger.

7. A method of controlling a vehicle that performs external charging in which a power storage device mounted on the vehicle is charged with power supplied from a charger provided external to the vehicle in accordance with a prescribed charging standard, the method comprising:
   determining, by a controller of the vehicle, whether or not failure to perform the external charging in accordance with the charging standard is caused by the charger; and
   when failure to perform the external charging in accordance with the charging standard is caused by the charger, providing a user of the vehicle with at least one of information that the failure is caused by the charger and information that it is recommended to use another charger other than the charger.

8. The method according to claim 7, wherein the failure is determined by the controller of the vehicle after the vehicle is connected to the charger.

9. A vehicle that performs external charging in which a power storage device mounted on the vehicle is charged with power supplied from a charger provided external to the vehicle in accordance with a prescribed charging standard, the vehicle comprising:
   an information provision device that provides a user of the vehicle with information on the external charging;
   a power converter that converts power supplied from the charger into power for charging the power storage device;
   a voltage sensor that detects a voltage of the power supplied from the charger to the power converter;
   a current sensor that detects a current flowing from the charger to the power converter; and
   a controller that controls the information provision device,
   the controller controlling the information provision device, when failure to perform the external charging in accordance with the charging standard is caused by the charger, to provide the user with at least one of information that the failure is caused by the charger and information that it is recommended to use another charger other than the charger, the controller determines that the failure is caused by the charger when it is detected using at least one of the voltage sensor and the current sensor that the power supplied from the charger does not conform to the charging standard.

* * * * *